(12) United States Patent
Lowry et al.

(10) Patent No.: US 7,344,178 B2
(45) Date of Patent: Mar. 18, 2008

(54) VEHICLE COVERING STRUCTURE

(75) Inventors: Graeme W. Lowry, Arva (CA);
Claudio O. Beloiu, London (CA);
Terry B. Coomber, Dundas (CA)

(73) Assignee: Roll-Tite, Inc., Ontario (CA)

( * ) Notice: Subject to any disclaimer, the term of this patent is extended or adjusted under 35 U.S.C. 154(b) by 64 days.

(21) Appl. No.: 11/412,104

(22) Filed: Apr. 27, 2006

(65) Prior Publication Data
US 2006/0261629 A1    Nov. 23, 2006

Related U.S. Application Data

(60) Provisional application No. 60/675,893, filed on Apr. 29, 2005.

(51) Int. Cl.
*B60P 7/02*    (2006.01)

(52) U.S. Cl. .......................... 296/100.12; 296/100.18; 296/29

(58) Field of Classification Search ........... 296/100.11, 296/100.12, 100.13, 100.17, 100.18, 29, 296/30
See application file for complete search history.

(56) References Cited

U.S. PATENT DOCUMENTS

| | | | |
|---|---|---|---|
| 2,768,004 A | 10/1956 | Wagner | |
| 3,310,338 A | 3/1967 | Greenberg | |
| 3,326,598 A | 6/1967 | Kunsch | |
| 3,433,470 A | 3/1969 | Erke | |
| 4,289,346 A | 9/1981 | Bourgeois | |
| 4,342,480 A | 8/1982 | Ross | |
| 4,382,736 A | 5/1983 | Thomas | |
| 4,711,484 A | 12/1987 | Tuerk | |
| 4,854,630 A | 8/1989 | Biancale | |
| 4,902,064 A | 2/1990 | Tuerk et al. | |
| 5,026,109 A | 6/1991 | Merlot | |
| 5,078,560 A | 1/1992 | Patrick et al. | |
| 5,080,422 A | 1/1992 | Demonte et al. | |
| 5,080,423 A | 1/1992 | Merlot et al. | |
| 5,118,232 A | 6/1992 | Shuker | |
| 5,129,698 A | 7/1992 | Cohrs et al. | |
| 5,152,575 A | 10/1992 | Demonte | |
| 5,174,625 A | 12/1992 | Gothier et al. | |
| 5,203,393 A | 4/1993 | Blevins et al. | |
| 5,230,434 A | 7/1993 | Patrick et al. | |
| 5,238,357 A | 8/1993 | Patrick et al. | |
| 5,251,947 A | 10/1993 | Kirila, II et al. | |
| 5,256,023 A | 10/1993 | Patrick et al. | |
| 5,288,123 A | 2/1994 | Dimmer | |
| 5,291,933 A | 3/1994 | Fussnegger et al. | |
| 5,338,084 A | 8/1994 | Wardell | |

(Continued)

FOREIGN PATENT DOCUMENTS

CA    944412    3/1974

(Continued)

*Primary Examiner*—Lori L. Lyjak
(74) *Attorney, Agent, or Firm*—B. Aaron Schulman; Stites & Harbison PLLC

(57) ABSTRACT

A cover system for a trailer of a freight transport vehicle having a cargo space, the cover system having a pair of track brackets, tracks, generally U-shaped bow portions mounted to the trucks so that there is displacement of the bow portions as each member of the pair of trucks is displaced along the length of the members of the track and a flexible canopy supported by the bow members for covering or uncovering the cargo space.

12 Claims, 12 Drawing Sheets

U.S. PATENT DOCUMENTS

| | | |
|---|---|---|
| 5,362,198 A | 11/1994 | Patrick |
| 5,429,408 A | 7/1995 | Henning et al. |
| 5,498,057 A | 3/1996 | Reina et al. |
| D368,888 S | 4/1996 | Stephens et al. |
| 5,525,026 A | 6/1996 | Demonte et al. |
| 5,538,313 A | 7/1996 | Henning |
| 5,566,471 A | 10/1996 | Hirano |
| 5,658,037 A | 8/1997 | Evans et al. |
| 5,664,824 A | 9/1997 | Stephens et al. |
| 5,690,377 A | 11/1997 | Denyer |
| 5,769,704 A | 6/1998 | Henning et al. |
| 5,924,759 A | 7/1999 | Demonte et al. |
| 5,938,270 A | 8/1999 | Swanson et al. |
| 5,957,351 A | 9/1999 | Gothier |
| 6,006,809 A | 12/1999 | Williams et al. |
| 6,065,796 A | 5/2000 | Verduyn |
| RE36,748 E | 6/2000 | Stephens et al. |
| 6,116,044 A | 9/2000 | Gothier |
| 6,139,085 A | 10/2000 | Templin et al. |
| 6,234,562 B1 | 5/2001 | Henning |
| 6,250,233 B1 | 6/2001 | Luckring |
| 6,282,791 B1 | 9/2001 | Patelczyk |
| 6,318,790 B1 | 11/2001 | Henning |
| 6,338,521 B1 | 1/2002 | Henning |
| 6,343,613 B1 | 2/2002 | Yasutomi |
| 6,367,862 B2 | 4/2002 | Henning |
| 6,419,301 B1 | 7/2002 | Tuerk |
| 6,435,595 B1 | 8/2002 | Chenowth |
| 6,457,622 B2 | 10/2002 | Henning |
| 6,474,718 B1 | 11/2002 | Henning |
| 6,474,719 B2 | 11/2002 | Henning |
| 6,481,779 B1 | 11/2002 | Gothier et al. |
| 6,494,246 B1 | 12/2002 | Blevins |
| 6,502,709 B1 | 1/2003 | Parker |
| 6,511,117 B1 | 1/2003 | Henning |
| 6,527,331 B2 | 3/2003 | Searfoss |

FOREIGN PATENT DOCUMENTS

| | | |
|---|---|---|
| CA | 995714 | 8/1976 |
| CA | 1212974 | 10/1986 |
| CA | 1331635 | 8/1994 |

VEHICLE COVERING STRUCTURE

CROSS REFERENCE TO RELATED APPLICATIONS

The present application claims priority from U.S. Provisional Application No. 60/675,893 filed on Apr. 29, 2005 the content of which is hereby incorporated by reference.

FIELD OF THE INVENTION

This invention relates to covers, in particular but not exclusively to covers for freight transport vehicles.

SUMMARY OF THE INVENTION

In certain modes of freight transport, it is desirable to have a load supporting deck structure of some kind, and a movable superstructure. The deck structure is used to support lading of some kind, perhaps steel coils, auto parts, or some other object. The movable superstructure is used to protect the lading from the elements (wind, snow, sleet, rain, dirt, and undesirable exposure to direct sunlight, for example), yet, by being movable, permits the loading of large objects either from above or from the side, in a manner that would not otherwise be possible with a fixed superstructure.

In some instances, it may be possible to achieve this end with a superstructure of rigid panels, or an arch-like section, where several rigid sections can telescope on inside another, thus giving better access to the deck for loading. However, in one type of covering superstructure, such as has been used on highway trailers, for example, the superstructure is made up of a number of rigid frames, such as may typically roll or slide upon a pair of rails along either longitudinal edge of the trailer bed, used in co-operation with a flexible covering, in the nature of a tarpaulin. When the arches, or frames (typically referred to as "bows") are in place, the tarpaulin extends over them to provide a canopy which covers the lading.

Two patents that show the general layout and description of the principles and operation of flexible tarpaulins for highway trailers are U.S. Pat. No. 5,152,575 of DeMonte et al., issued Oct. 6, 1992; and U.S. Pat. No. 5,538,313 of Henning, issued Jul. 23, 1996, and U.S. Pat. No. 6,511,117 of Henning, issued Jan. 28, 2003.

Movable tarpaulin systems may come in a relatively flat top style, as shown in the two Henning patents (supra), or in a centrally peaked style, as shown in Demonte. Demonte shows a number of variations between a fully deployed tarpaulin system and a retracted system. Most commonly, the bows and their tarpaulin covering are moved to an accordion style position near the front of the truck bed. Whereas DeMonte shows only single bows, Henning shows, in both patents, doubled bows at both the foremost and rearmost positions, and single bows arrayed therebetween.

A movable cover not only permits access to the load, but, in addition, may be a lighter structure. This is particularly so when the frame elements are made of aluminium rather than steel. This is also desirable in terms of maintaining a lower centre of gravity than might otherwise be the case.

In highway use, a number of features may be noted. First, it is desirable that the tarpaulin covering be of a relatively heavy duty material, and that, in use, the tarpaulin be drawn relatively tightly over the bows. Within reason, the tighter the tarpaulin covering is stretched over the bows, the longer the service life of the covering. That is, if the cover is allowed to flap excessively in the wind, wear of both the cover and the underlying bow assemblies may tend to be more rapid than if the elements of the system are held more tightly in place.

In attempting to achieve this desired structural relationship, existing highway trailer systems tend to use fabricated bow structures, where the method of fabrication is the painstaking welding together of piece parts. A typical welded bow may tend to require a large number of welds by a highly trained welder. This is particularly so when the bows are fabricated of aluminium, and generally speaking, a greater level of skill is required reliably to weld aluminium than other metals, such as steel. The process tends to be slow, it tends to require a large number of welds, and tends to be highly labour intensive. It has been observed that the top corner fittings at each side of the double bows may tend to be particularly troublesome. Although some attempts have been made to cast the top corner fittings, this has not necessarily been as successful as might have been desired. That is, casting may sometimes have a tendency to be brittle. Alternatively, such parts can be machined from solid, but this may tend to result in expensive parts that may simply not be commercially viable.

Not only is such a form of construction highly reliant on the skill of the individual welder, but, further, notwithstanding the use of jigs, it is improbable that any two bows will be the same. Repeatability may tend to be poor. The process may be prone to generate a relatively high proportion of scrapped assemblies. Each manufacturing inconsistency may tend to yield a point of higher stress concentration in the fabric cover, or may yield a protrusion or other imperfection tending toward premature wear of components. Alternatively, a badly made weld, may be a crack initiation site, and hence may tend to be the cause of premature failure.

Further still, the all welded styles of construction complicates distribution and repair. The built up bows are large and cumbersome to distribute and if a bow is damaged, the remedy is to re-supply an entire fabricated replacement bow, or to require a custom repair at the location of the trailer upon which the covering structure is mounted. Shipment of a fully built-up fabricated bow tends to be cumbersome, and prone to damage. Repair on site tends to require a qualified welder of aluminium.

It is therefore an object of the present invention to obviate or mitigate the above disadvantages.

BRIEF DESCRIPTION OF THE DRAWINGS

The features of the invention will become more apparent in the following detailed description in which reference is made to the appended drawings wherein.

DETAILED DESCRIPTION OF THE INVENTION

Figure 1:
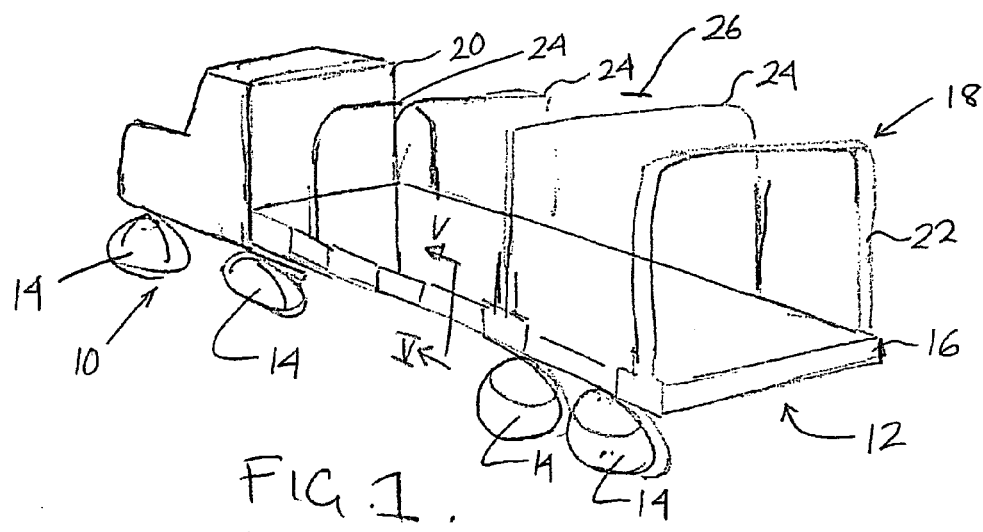
FIG. 1 is a perspective view of a tractor and trailer combination.

Referring therefore to FIG. 1, a tractor 10 is connected through a conventional fifth wheel to a trailer 12, both of which are supported on respective axial assemblies 14. The trailer 12 includes a trailer bed 16 that is formed in a conventional manner with a structural steel frame and decking. The trailer bed is typically between 45 and 60 feet long and designed to carry a variety of goods.

The bed 16 is covered by a canopy structure 18 that is secured to the bed 16. The canopy 18 includes a headboard 20, a rear bow structure 22 and intermediate bow structures 24 spaced between the headboard 20 and the rear bow 22. Sections of flexible covering 26 extend between the bows to provide a continuous weather proof canopy over the bed 16.

The bows 22, 24 are slidable relative to the trailer bed 16 as will be described more fully below, to allow the canopy 18 to be retracted and expose the trailer bed 16. To protect goods supported on the bed 16 during transit, the canopy 18 may be deployed providing a secure weather tight canopy for the goods.

Figure 2:
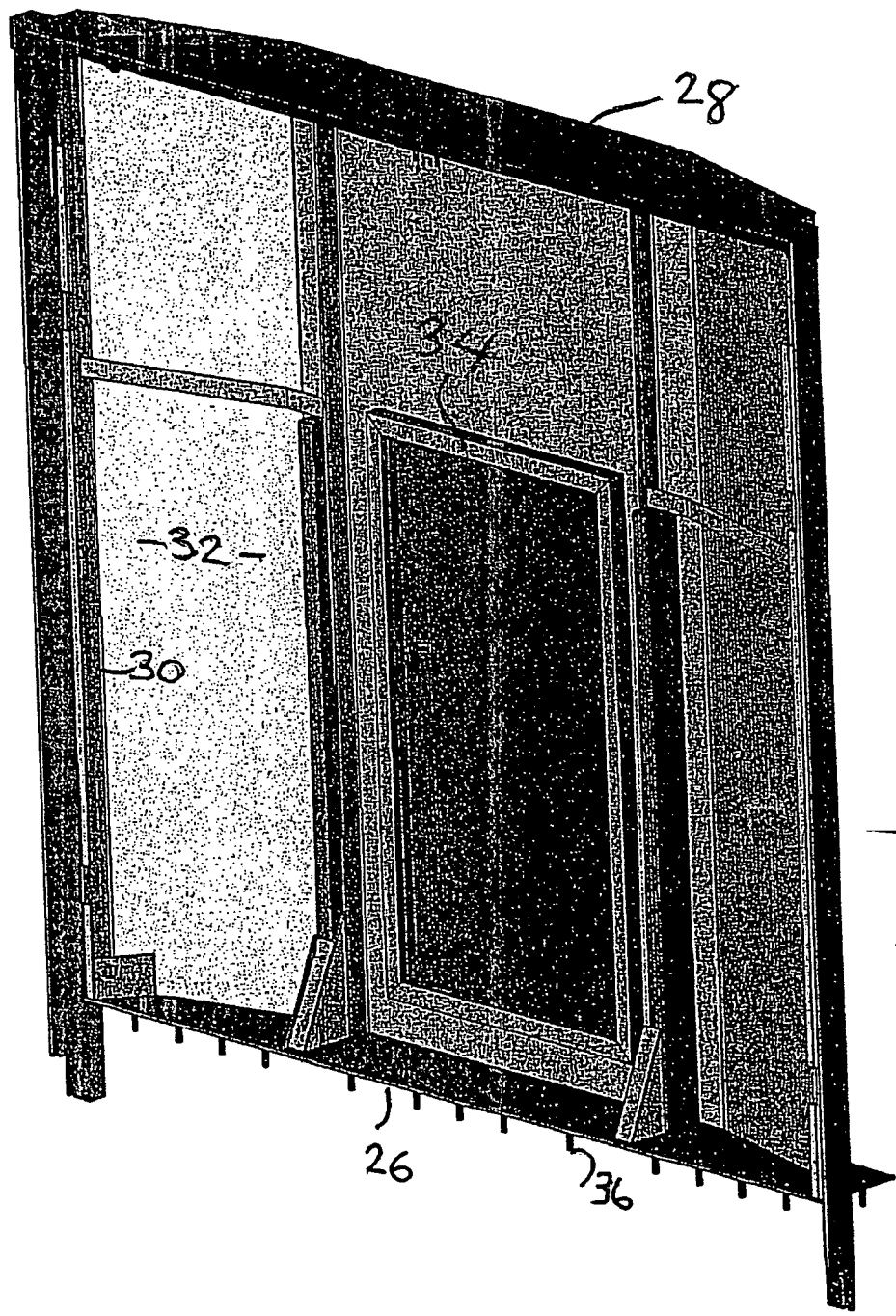
FIG. 2 is a rear perspective view of a headboard used on the trailer of FIG. 1.

The headboard 20 is shown in more detail in FIG. 2 and includes upper and lower plates 26, 28 with vertical frame members 30 extending between the plates. Panels 32 are secured to the frame members with a door 34 provided to permit access to the interior of the canopy from the forward end of the trailer. The plate 26 is secured with bolts 36 to the trailer bed 16 to provide a rigid structure.

Figure 3:
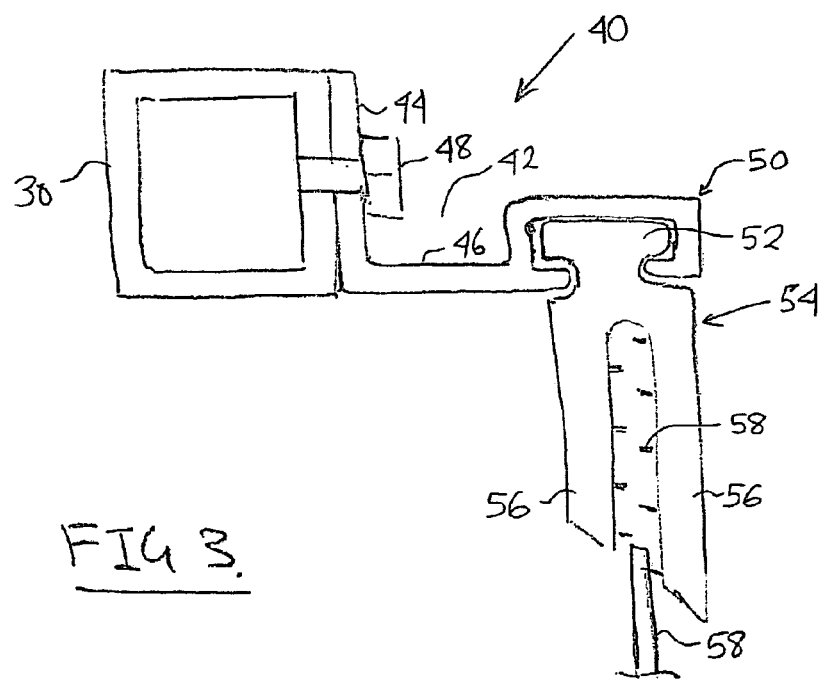
FIG. 3 is a section on the line III-III of FIG. 2.
Figure 4:
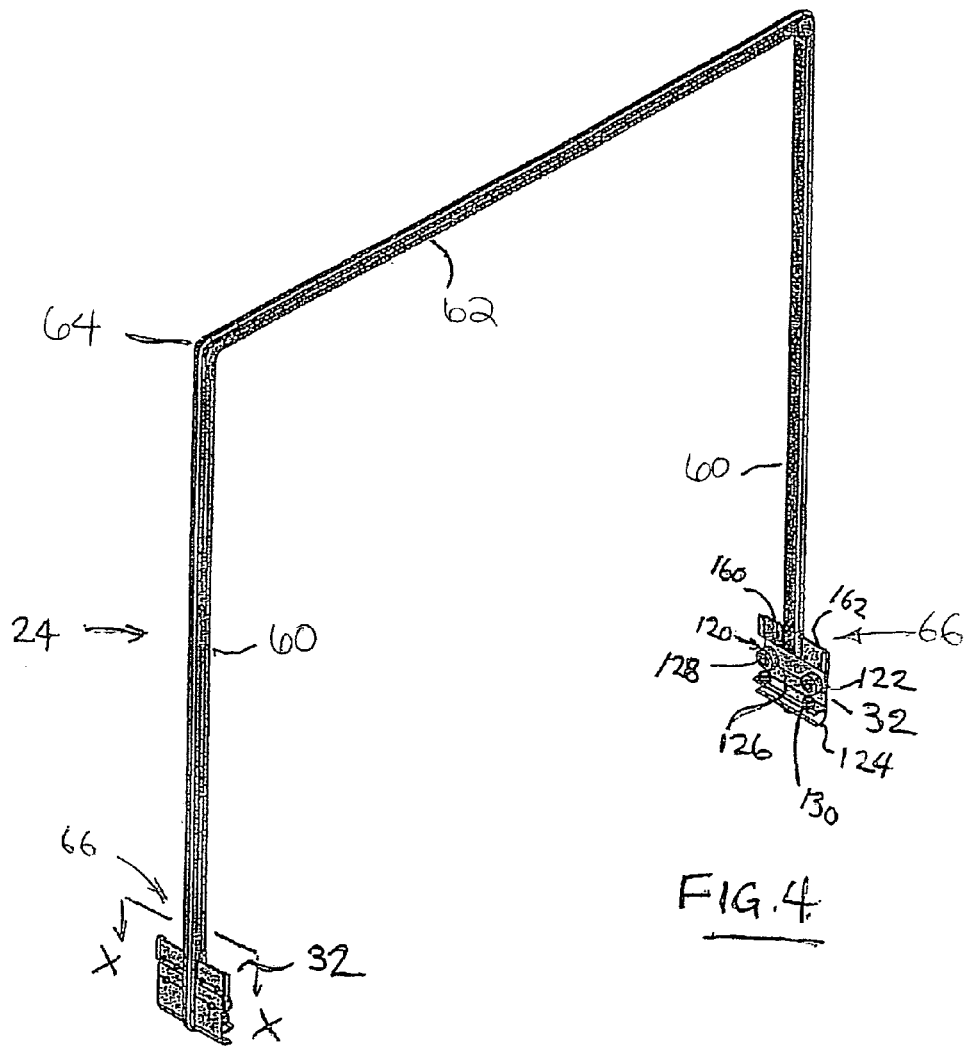
FIG. 4 is a perspective view of a bow used on the trailer of FIG. 1.

The outer frame members 30 are provided with wing extensions 40 to facilitate sealing of bow 24 to the headboard 20. The extension 40 is best seen in FIG. 3 and includes a right angled extrusion 42 having flanges 44, 46. The extrusion 42 is secured to the structural member 30 with bolts 48. The flange 46 terminates in a re-entrant channel 50 that receives the undercut head 52 of a seal 54. The seal 54 has a pair of legs 56 with inwardly directed sealing ribs 58. The seal 54 is formed from a flexible rubber or plastics material and extends around each frame member 30 and across the upper panel 28. The legs 56 are spaced apart to receive a flange 58 projecting from the adjacent intermediate bow 24 that can best be seen in FIG. 4. Over centre clamps (not shown) secure the bow 24 to the headboard.

The bow 24 has a pair of vertical jambs 60 interconnected by a header 62. The jambs 60 and header 62 are interconnected by respective corner assemblies 64 and the lower ends of each of the jambs are supported on respective trucks 66. As will be described in more detail below, the trucks 66 support the intermediate bows to permit longitudinal movement relative to the trailer bed 16.

Figure 5:
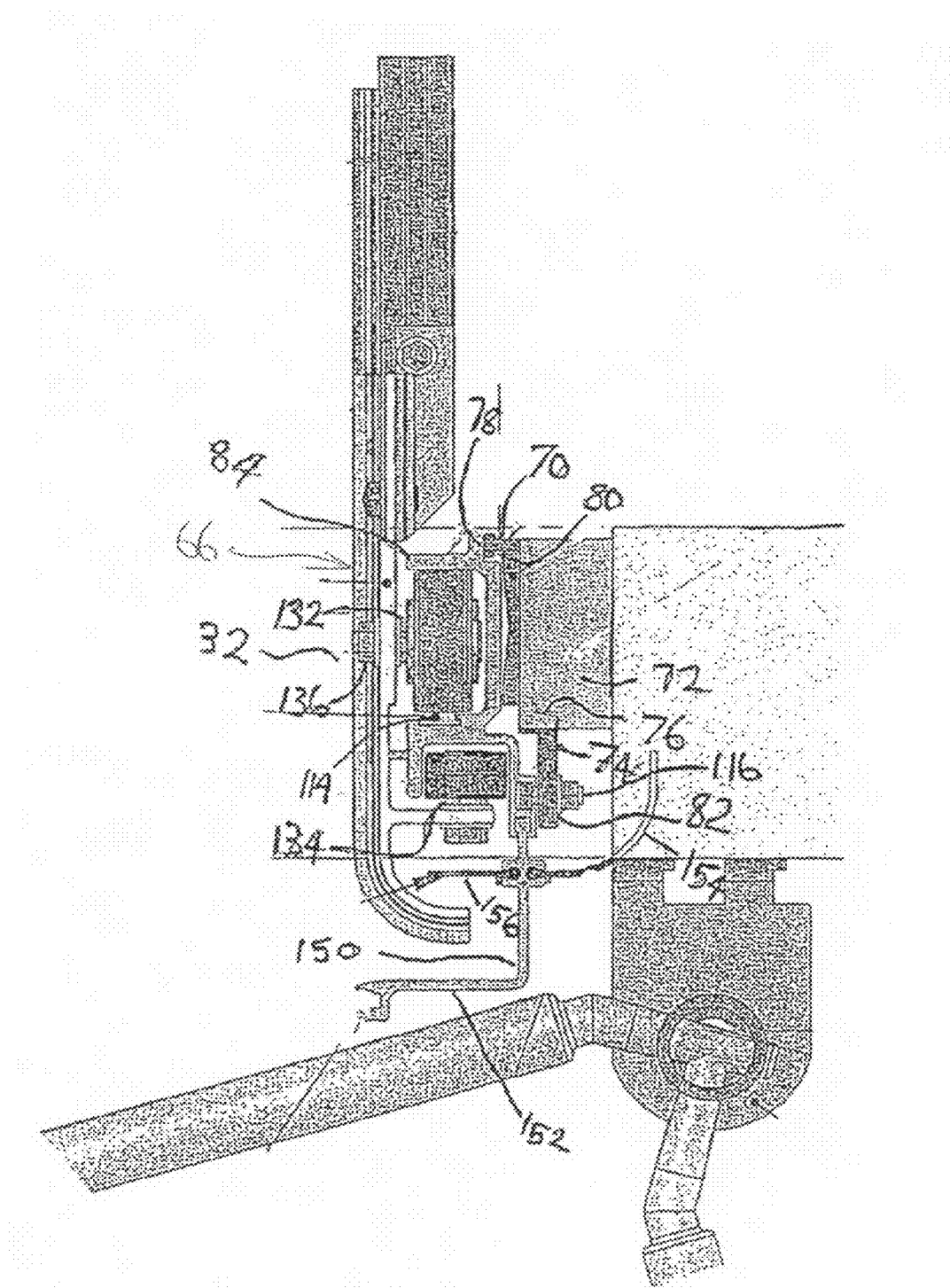
FIG. 5 is a section on the line V-V of FIG. 1.
Figure 6:
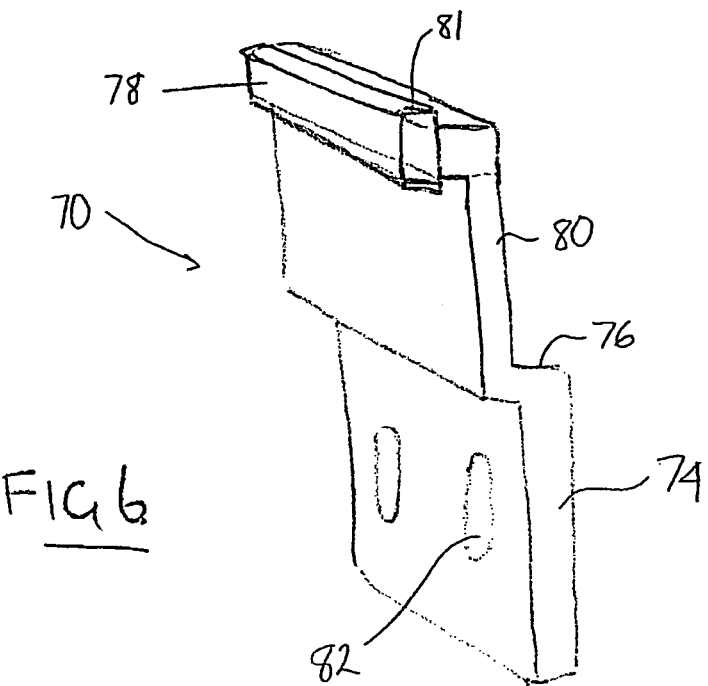
FIG. 6 is a perspective view of a bracket used in the trailer of FIG. 1.

The connection of the trucks 66 to the trailer bed 16 can best be seen in FIG. 5. Track brackets 70 are located between a rub rail 68 and the outwardly directed face of the bed 16 so as to be outboard of stake pockets 72 that are typically installed along the length of the trailer. The rub rail 68 is an elongate strip secured to the bed 16 and spaced outwardly from it. The brackets 70, shown in FIG. 6, are formed as an elongate inverted "L" in section having a vertical leg 74 that is cranked as indicated at 76 intermediate its ends. An enlarged head 78 is formed on the other leg 80 to present an upstanding shoulder 81 on the upper surface. The lower end of leg 74 is formed with a pair of slotted holes 82.

Brackets 70 are located at spaced intervals along both sides of the bed 16 to support discrete lengths of aluminium track 84 typically eight feet long. The sections of track 84 are located end to end so as to extend along the entire length of the bed 16.

Figure 7:
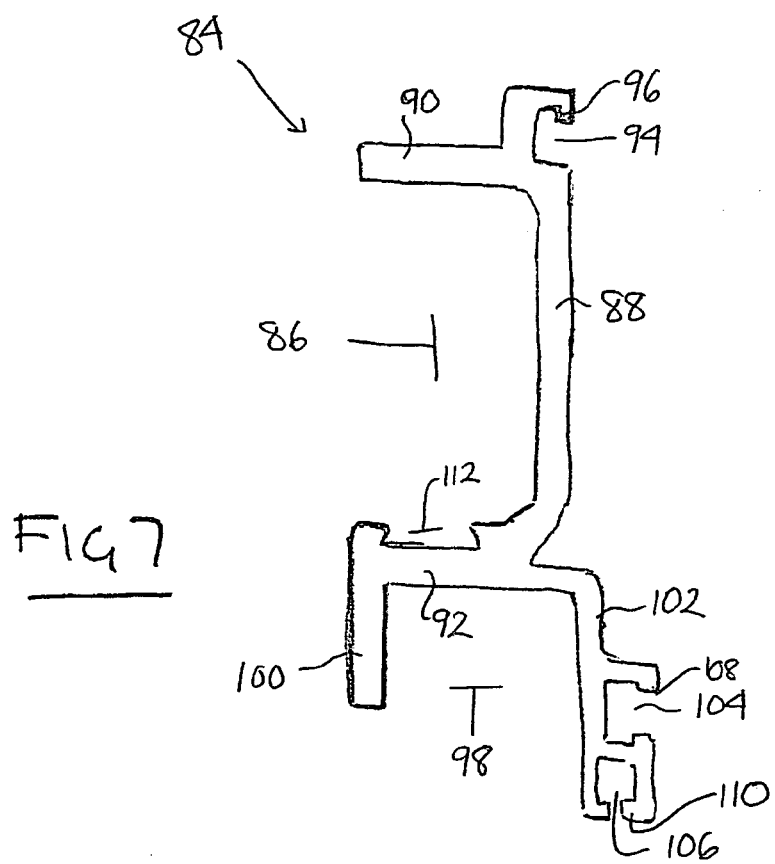
FIG. 7 is an end view of a track used in the trailer of FIG. 1.

The track 84 can best be seen in FIG. 7 and has a channel 86 defined by a rear wall 88 and vertically spaced side walls 90,92. A laterally directed channel 94 is provided at the intersection of the rear wall 88 and the side wall 90 and has a downwardly extending lip 96. The channel 94 is dimensioned to receive the head 78 of the track bracket with the shoulder 81 co-operating with the lip 96 to inhibit lateral movement between the bracket and track member. The channel opening defined between the lip 96 and the opposite walls of the channel 94 is sufficient to receive the head 80 and thereby permit the track to be hooked onto the bracket 70.

The track 84 also includes a downwardly directed channel 98 whose base is formed by the side wall 92. The channel 98 has a pair of side walls 100, 102 with the side wall 102 being formed with a pair of slots 104, 106 at its terminal portion. The slots have overhanging lips 108, 110 respectively to partially enclose the slots 104, 106.

The side wall 92 is also formed with a re-entrant groove 112 directed toward the opposite side wall 90. The groove 112 is relatively wide compared to its depth and is dimensioned to receive a bearing strip 114 shown in FIG. 5. The bearing string 114 is extruded from a low friction coefficient plastics material, such as ultra high molecular weight plastic, and provided in sections of convenient length.

Referring again therefore to FIG. 5, it will be seen that individual lengths of track 84 are located on respective brackets 70 with the head 78 located in the channel 94. The track 84 is secured in location by bolts 116 whose head is located within the groove 104 and secured by the overhanging lips 108. The bolt passes through the slots 82 provided in the leg 74 of the bracket 70 and are secured by nuts. Accordingly, the track 84 is secured to the brackets with the lip 96 and bolt 116 inhibiting relative movement between the bracket 70 and the track 84 and the rub rail is gripped between the rack 84 and bracket 70. The brackets and tracks are able to slide vertically relative to the bed 16.

The individual pieces of the track 84 are aligned along the length of the bed 16 so that the slot 112 is continuous from one end to the other. Sections of the plastic bearing strip 114 may then be inserted in the slot 112 to provide a continuous bearing surface over the individual segments of track. The individual lengths of bearing strip 114 are arranged to be staggered relative to the sections of track so that the joints between the individual lengths of track is bridged by the strip 114.

To inhibit ingress of water and debris, a seal assembly generally indicated at 150 is secured to the slot 106 on the track. The seal assembly has an "L" shaped plastic deflector 152 that projects beneath the trucks 66. A pair of flexible seals 154, 156 project to opposite sides of the "L" shaped member 152 and seal between the track and deck and overlie the trucks 66 respectively.

Figure 8:
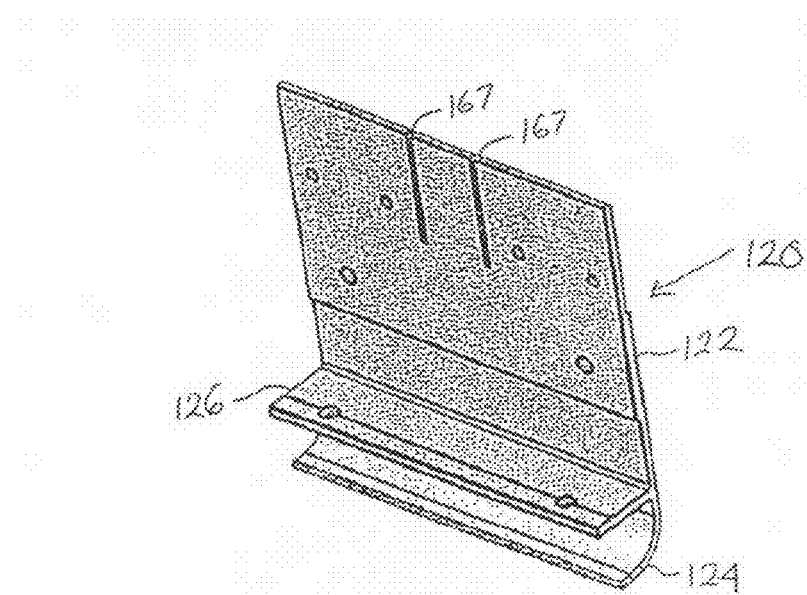
FIG. 8 is a perspective view of a body of a carriage used on the trailer of FIG. 1.

Track 84 supports the trucks 66 of the intermediate bows 24. The trucks 66 include a carriage body 120, shown in isolation in FIG. 8, that has a planar upper portion 122 and a curved lower portion 124. A flange 126 projects outwardly from the planar portion 122 to overlie the curved portion 124. A pair of support wheels 128 are mounted at spaced locations on the planar portion 122 and are received within the channel 86 of the track 84. A pair of guide wheels 130 are mounted on the flange 126 and received within the channel 98. Each of the wheels 128, 130 is mounted on a respective spindle 132, 134 and secured with a nut 136. The support wheels 128 bear on the plastic bearing strip 114 to provide a smooth movement along the track 84 and the spaced locations of the guide wheels 130 inhibit yawing of the intermediate bow as it moves along the track. The orientation of the channel 98 also ensures that debris and contaminants do not collect to impair rolling of the wheels 130.

The carriage body 120 supports the vertical jambs 60 through the use of a pair of support brackets 160, 162. The support brackets 160, 162 are bolted to the upper planar section 122 of the body 120 and have inturned flanges 164, 166 at the inner edges. Locking blocks 168 extend along the flanges 164, 168 and are secured by lock screws 170 and are threaded onto the upper portions of the flanges 164, 166. A pair of slots 167 are formed in the planar section 122 between the flanges 164, 166.

Figure 9:
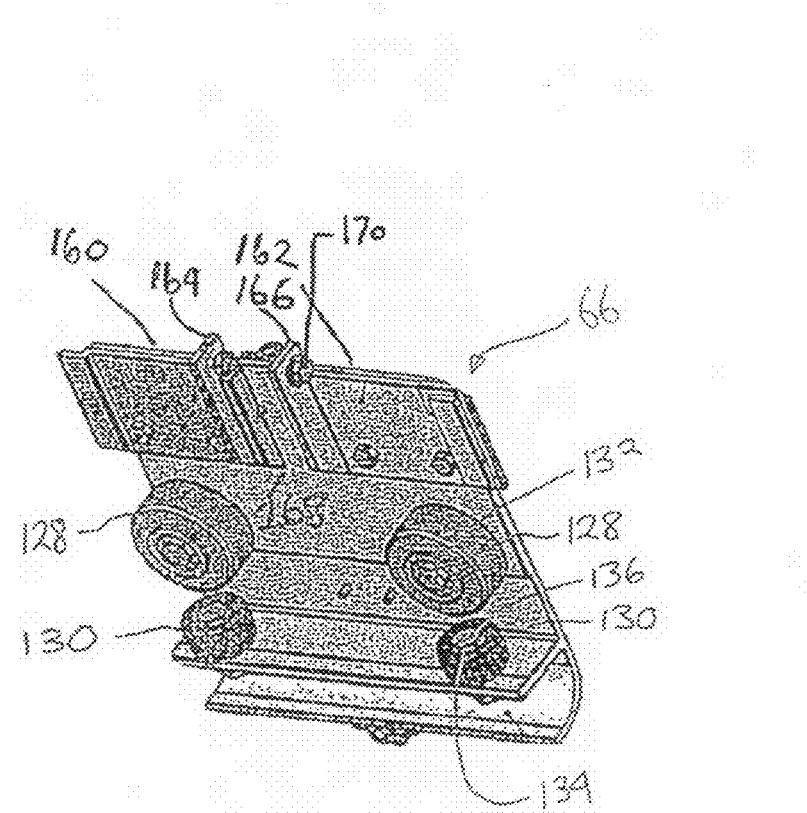
FIG. 9 is a top perspective view of an assembled carriage using the body of FIG. 8.

The jambs 60 are each made from lengths of extruded aluminium, the profile of which is shown in FIG. 9.

Figure 10:
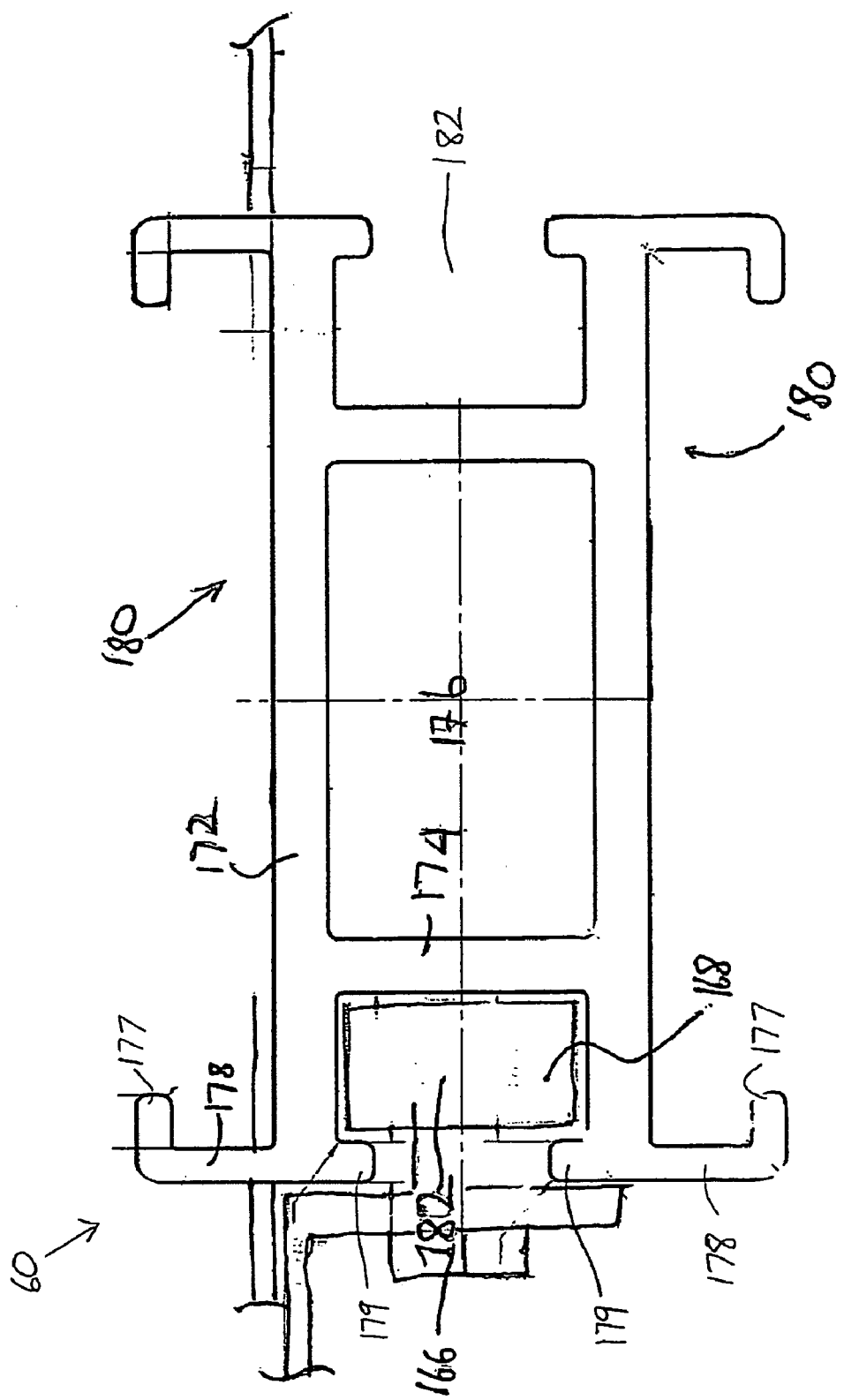
FIG. 10 is a section on the line X-X of FIG. 4.

The jamb 60, shown in FIG. 10, has a pair of major walls 174 and a pair of lateral interconnecting webs 172 to define a central rectangular core 176. The terminal portions of each of the walls 172 merges with a "L" shaped arm 178 with orthogonal fingers 177, 179. The fingers 177 of the "L" shaped arms 178 in combination with the walls 172 define a re-entrant slot 180 along each major face of the jamb 60. Similarly, the walls 172, 174 co-operate with the fingers 179 of arms 178 to define re-entrant lateral slots 182.

The lateral slots 182 are dimensioned to receive the block 168 with the flanges 164 abutting the outer faces of the arms 178. The bolts 166 can then secure the block within the slot 168. The fingers 178 out board of the web 172 pass through slots 167 formed in the planar portion 122 of the body 120 so that the jamb 60 is received on the body 120. It is then clamped between the flanges 164, 166 and respective ones of the blocks 168.

Figure 11:
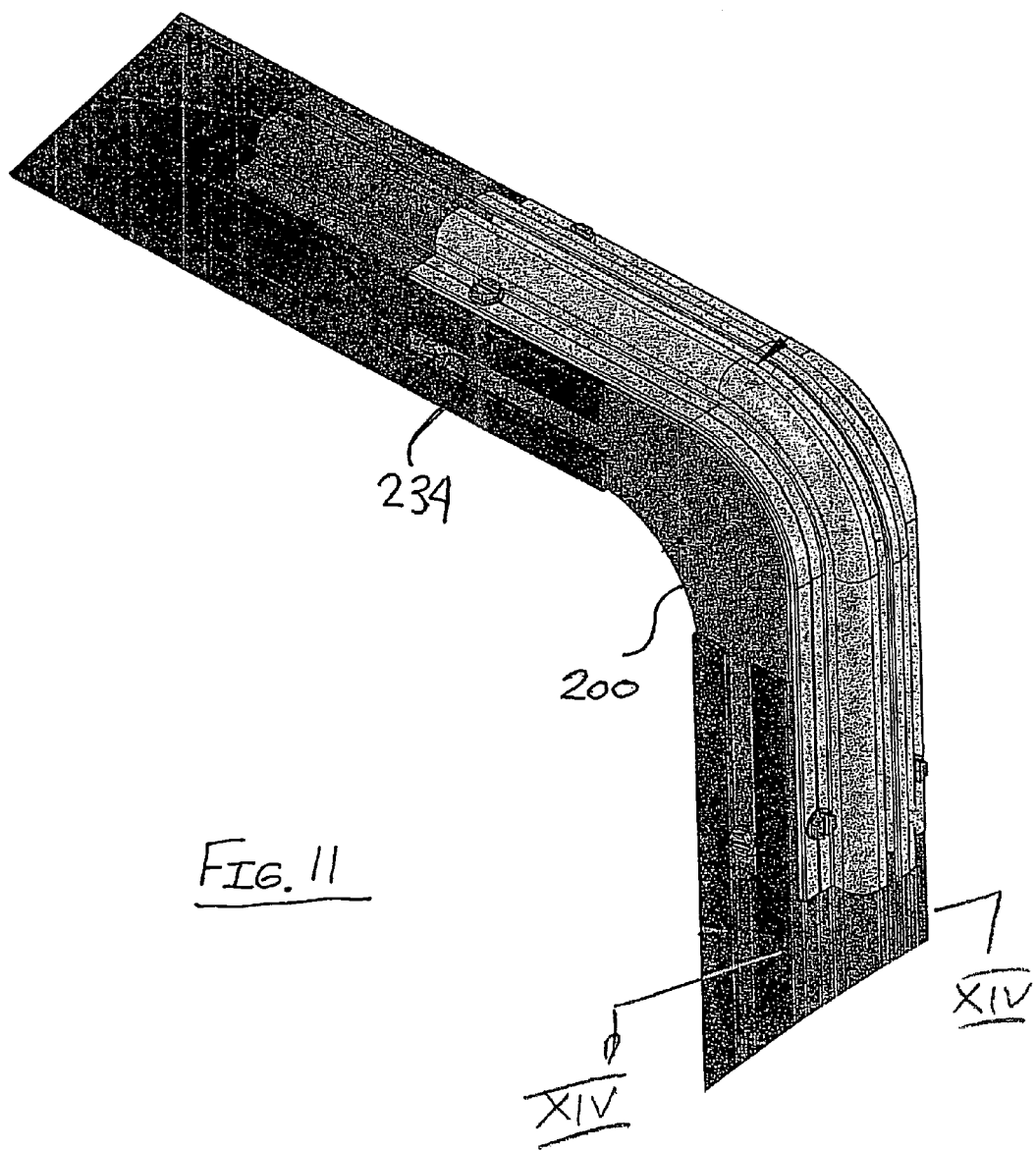
FIG. 11 is a perspective view of the a corner of the bow shown in FIG. 4.
Figure 12:
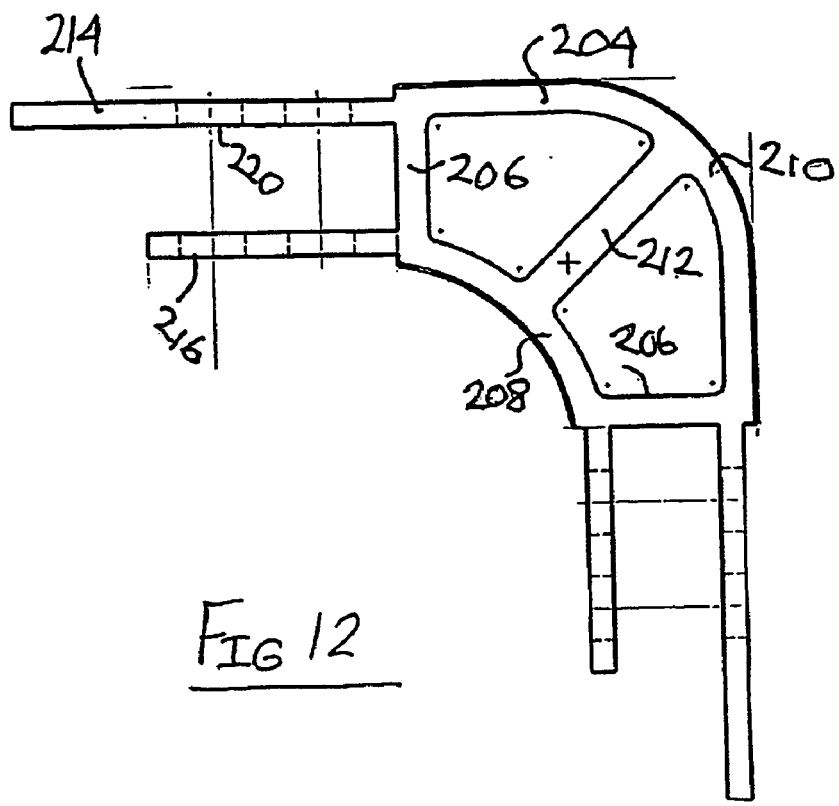
FIG. 12 is a side view of a bracket used in the corner of FIG. 11.

The header 62 is formed from the same profile extrusion as the jambs 60 and connected to the jambs 60 through the corner assemblies 64. The details of the corner assembly 64 are best seen in FIGS. 11 and 12 and includes a corner bracket 200 and a pair of corner plates 202. The corner bracket 200 has a central body 204 with oppositely directed end faces 206. The end faces 206 are interconnected by inner and outer curved webs 208, 210 with a radial web 212 extending between them. The curved webs 208, 210 extend through 90° so that the faces 206 are orthogonal to one another.

A pair of tongues 214, 216 extend from each of the faces 206 and are offset from the outer surfaces of the webs 204, 208 so that a shoulder is defined at the outer edges of the face 206. The tongues 214, 216 are spaced apart sufficiently to be a sliding fit over the bases of the walls 172 in the slots 180 and the width of the corner bracket 202 corresponds with the width of the core 176. Holes 220 are provided in each of the tongues 214, 216 to permit complementary holes to be drilled in the walls 172 and for the suitable fasteners, such as those known as "Rev-nut" to be inserted. A bolt 218 passes through the "Rev-nut" if preferred to secure the corner bracket 200 to the header 62 and jamb 60 respectively.

It will be appreciated that by virtue of the constant width of the corner bracket, the brackets may be obtained from a continuous extrusion having the profile of the corner bracket.

Figure 13:
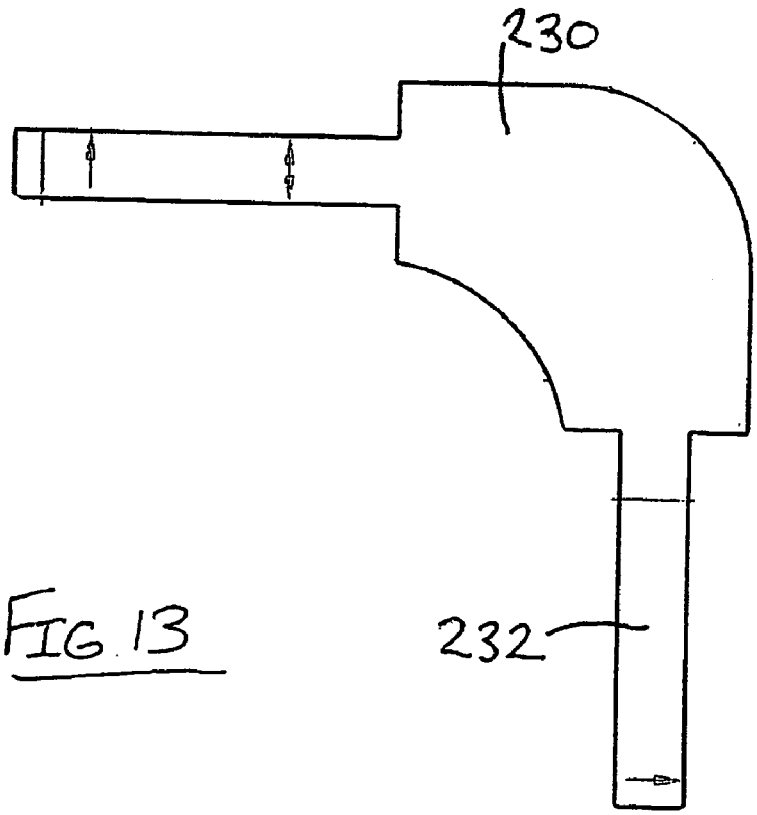
FIG. 13 is a side elevation of a plate used in the corner of FIG. 11.

The corner plates 202 are illustrated on FIG. 13 and have a central body portion 230 corresponding in profile to the body portion 204 of the corner bracket. Tongues 232 project outwardly from orthogonal faces of the body 230 to be received within the slots 168. The plates 202 are secured in that the slots 168 by set screws 234 to form a rigid corner assembly.

Figure 14:
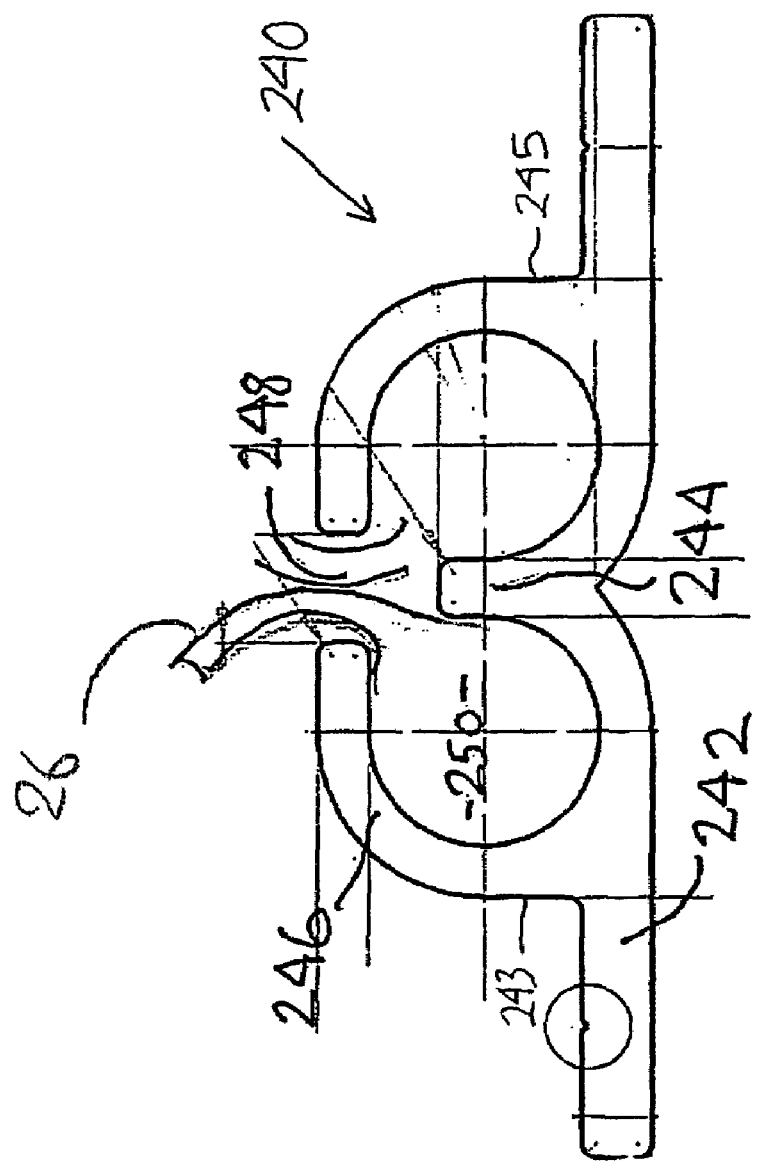
FIG. 14 is a section on the line XIV-XIV of FIG. 11.
Figure 15:
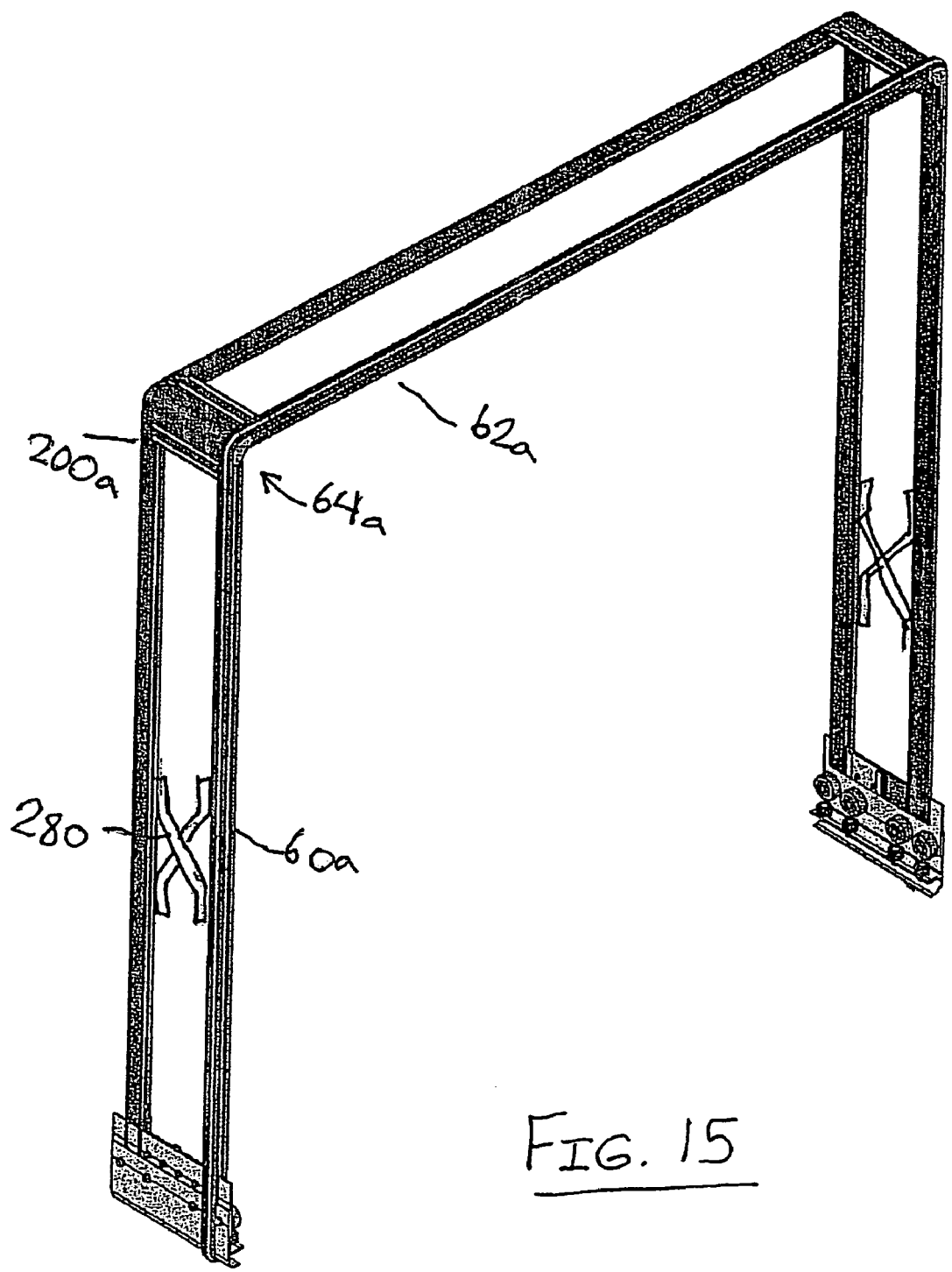
FIG. 15 is a perspective view of a rear bow.

When assembled, the bow 24 has an outer surface defined by one of the slots 180 of the jamb and header. The slots 180 are used to locate a tarp holder 240 that in turn is used to secure the flexible covering 26 to the bows. The tarp holder 240 is formed by a plastic extrusion shown in greater detail in FIG. 14. The tarp holder extrusion is formed from an aluminium material and has a generally planar base 242 with oppositely directed faces 243, 245 and a central partition 244. Upstanding retaining walls 246 extend from wall 243 of the base 242 to either side of the partition 244 with a gap 248 provided between opposite ends of the retaining walls 246. The partition 244 and the retaining walls 246 define a pair of circular voids 250 interconnected at the gap 248. The voids 250 receive a beaded edge of the flexible covering 26 as will be described more fully below.

The base 242 has a width corresponding to the width of the slot 180 on the jamb 60 and header 62 so that it may be slid into the slot 180 and retained by the ears 178. The tarp holder extrusion 240 is thus able to extend along the linear extent of the jambs 60 and header 62 to provide a continuous fixture for retaining the tarpaulins.

To accommodate the corner assemblies 64, the extrusion 240 is bent through 900 on a radius corresponding to the outer radius of the corner bracket 200. The corner tarp holder thus smoothly merges with the linear runs on the jamb 60 and header 62 to provide continuity to the voids 250 and gap 248 and is secured in place by set screws 252.

Similarly, at the lower end of the jamb 60, a foot extrusion 260 is formed to conform to the outer profile of the body 120. The foot extrusion 260 is secured to the body through the set screws 262 in the outer flanges of the base 242 and again provides a continuity of the voids 250 and gap 248.

With the tarp holder 240 corner extrusion and foot extrusion 260 is secured over the peripheral surface of the bow 22, a continuous void is formed to receive the covering 26. Each of the coverings 26 is of known construction and includes a membrane 270 and an enlarged breaded portion 272 at each edge. The beaded portion 272 conforms to the diameter of the void 250 with the membrane 270 passing through the gap 248. The edges of the covering 26 may therefore be slid along the tarp holder 240 from one end to the other to secure the tarpaulin to the bow 22.

The rear bow 22 is formed in a similar manner to the intermediate bow 24 and therefore like components will be identified with like reference numerals with a suffix 'a' added for clarity.

The rear bow 22 has two pairs of jambs 60a and two headers 62a connected by corner assemblies 64a. The lower end of the jambs 60a are supported on trucks 66a with a body 120a formed from the same extrusion as body 120 but of greater overall length. The trucks 66a include two pairs of support wheels 128a and two pairs of guide wheels 130a.

The jambs 60a and header 62a are formed from the same extrusion as the jambs 60 and header 62a. Their connection to the upper planar portion 122a of the body 120a is similar to that described above with the planar portion having two pairs of slots 167a to provide a tongue or tine that can slide into the grooves 182a of the jambs 60a. The support brackets 160a, 162a are bolted to the upper portion 128a and secured respective ones of the jamb 60a through locking blocks and lock screws as described above. On the rear bow 22 however the support brackets 160a, 162a are located on the inner surfaces of the jambs only to avoid excessive length of the body 120a.

The corner assembly 64a similarly utilizes a corner bracket 200a that spans each of the jambs 60a at the respective corner assemblies 64a. The corner block 200a is formed from the same extrusion as the corner block 200 but of greater length to accommodate the spacing between the jambs 60a.

To accommodate the tongs 214a, 216a, the arms 178 are removed at the terminal portion of the inner surface of the jamb 60a and header 62a to allow the tongues to fit smoothly onto the wall 172. This notching is provided at the edges of each jamb at the intersection with the corners 64a.

Figure 16:
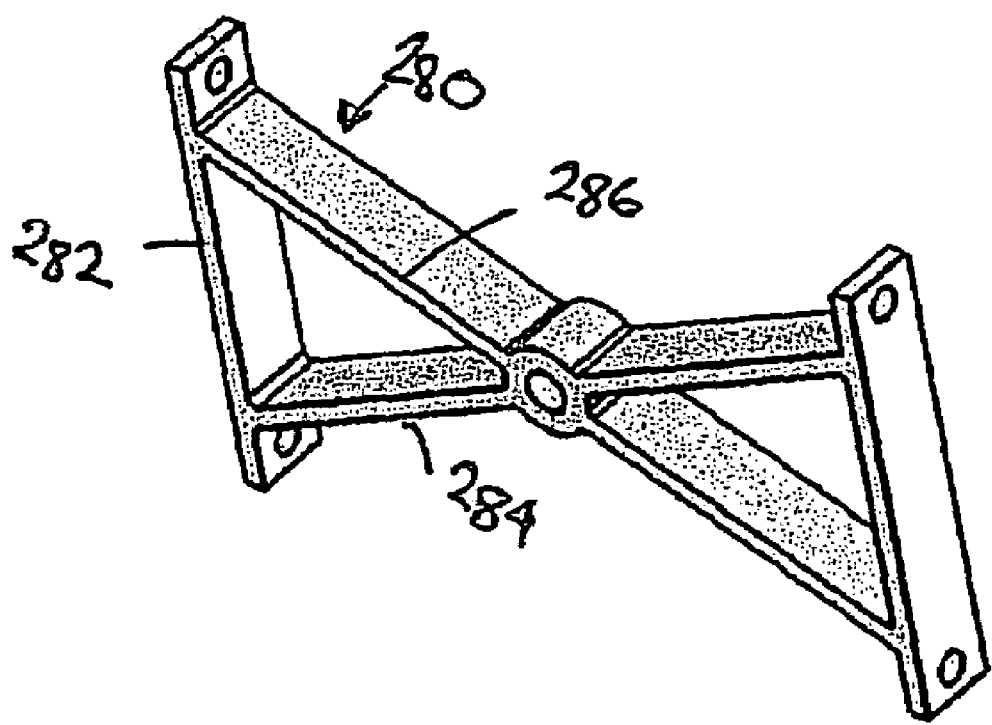
FIG. 16 is a perspective view of a bracket used in the rear bow of FIG. 15.

To enhance the rigidity of the rear bow, bracing members 280 are located between the jambs 60a mid way between the corner assembly 64a and the truck 66a. The bracing members 280 as best seen in FIG. 16 are formed from an extrusion and has a pair of spaced parallel feet 282 with inclined cross members 282, 284 extending between the feet 282. Each of the feet 282 has a pair of holes 288 that accommodate a machine screw to co-operate with a T-block positioned within the lateral grooves 182. The brace 280 may then be positioned along the length of the jamb and secured in position by tightening of the bolt.

It will be noted from the above description that the major elements of the canopy are formed from extrusions which are assembled to one another without resorting to welding. The jambs and headers are formed from lengths of common aluminium extrusion and the corner assemblies, which themselves are sections of an extrusion and secured to the jambs and headers by mechanical fastenings. This enables the jambs and headers to be supplied disassembled and assembled in situ using common tools.

Similarly, the track is supplied in manageable lengths, typically eight feet, to facilitate distribution and the arrangement of brackets and bearing strips provides for a continuous bearing surface allowing the track to extend the length of the truck although made from individual sections. The track brackets permit the track to float and thereby accommodate flexure in the bed 16 of the track under different load conditions whilst properly supporting the track and ensuring the continuous bearing surface for the support rollers.

The bodies 120 of the trucks 66 are similarly cut from extrusions and through the use of the support brackets provide a secure bolted connection to the jambs 60. The outer surfaces of the jamb also permit the tarp holder 260 to be secured in a continuous manner about the periphery and thereby maintain control over the flexible covering 26.

To assembly the canopy 18, the intermediate and rear bows are first assembled from the individual lengths of extrusion provided. Connections are made to the trucks and to the corner connections to provide completed bows without the necessity of welding. The track brackets are located on the rub strip and the tracks secured to the brackets, again by mechanical interconnection. The tracks are aligned and individual lengths of bearing strip inserted into the groove so that the joints between sections of the track are bridged. The headboard is assembled and bolted to the leading edge of the deck and the bows then slid onto the track with the support rollers and guide rollers engaged in their respective channels. Thereafter, the flexible coverings can be fed through the voids 250 from one truck 66 to the other. It will be noted on the rear bow that the tarp holder is only applied to the rear most jamb and header allowing the flexible coverings to extend to the rear most edge of the bow.

The deflector is secured to the underside of the track with the respective seals inserted. Again, the deflector is provided in discrete lengths and the joints between the deflector and the seals are themselves staggered to provide an overlapping labyrinth seal.

With the bows and covering assembled, the bows may be moved along the track to uncover or cover the deck. The provision of the guide wheels inhibits yawing motion of the bows in the event that a force is applied from one side thereby facilitating smooth operation of the bows. In order to cover the bed 16, the bows are moved rearwardly until limited by the extent of the covering 26. Tension is applied to the covering by a ratchet mechanism operating on the rear bow to ensure that it is held in situ relative to the bed.

It will be appreciated therefore that the canopy may be supplied in a disassembled form and readily assembled without the necessity for welding. The provision of extrusion at each corner provides a significant durability and strength.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

We claim:

1. A cover system for a trailer of a freight transport vehicle having a cargo space, the cover system comprising:
   (a) at least one pair of track brackets adapted for mounting on opposite sides of the trailer;
   (b) at least one pair of tracks adapted for mounting to the track brackets, each member of the pair of tracks extending horizontally along the sides of the trailer, each member of the tracks having a first channel, a second channel and an underhang;
   (c) at least one pair of trucks adapted for mounting in the tracks and further adapted for displacement along the opposite sides of the trailer along the length of the members of the pair of tracks;
   (d) a plurality of generally U-shaped bow portions, each of the bow portion having a horizontal upper bridging portion and a pair of leg portions extending downward from the horizontal upper portion, each leg portion having a distal end adapted for mounting on each member of the pair of trucks so that there is displacement of the bow portions as each member of the pair of trucks is displaced along the length of the members of the track; and
   (e) a flexible canopy supported by the bow portions for covering or uncovering the cargo space as each bow portion is displaced horizontally relative to the trailer along the length of the members of the pair of tracks.

2. The cover system of claim 1 wherein each member of the pair of trucks further comprises:
   (i) a carriage body, having an upper portion and a lower portion, the upper and lower portions separated by a flange extending from the upper portion;

(ii) a support wheel mounted on the upper portion and adapted to be received in the first channel of each member of the pair of tracks, the support wheel providing rolling horizontal movement of the trucks along the track;

(iii) a guide wheel mounted on the flange and adapted to be received in the second channel of each member of the pair of tracks, the guide wheel inhibiting yawing of the bow potions mounted on the truck as the support wheel moves along the track.

3. The cover system of claim 2 wherein each member of the pair of trucks further comprises a seal assembly secured to the underhang.

4. The cover system of claim 3 wherein the seal assembly further comprises a generally L shaped deflector having a first and second flexible flange extending from opposite sides of the deflector, the first flexible flange extending away from the deflector and towards the lower portion of each member of the pair of trucks.

5. The cover system of claim 4 wherein the support wheel rotates about a first axis and the guide wheel rotates about a second axis generally perpendicular to the first axis.

6. The cover system of claim 5 wherein the first axis is generally horizontal and the second axis is generally vertical.

7. The cover system of claim 5 wherein when one member of the pair of leg portions of the bow portions is moved along the track the flexible canopy expands or collapses in an accordion like manner.

8. The cover system of claim 7 wherein the first channel of the track has a groove directed towards the interior of the first channel and adapted to receive a strip and the support wheel bears upon the strip to provide smooth movement of the truck along the track.

9. The cover system of claim 8 wherein the strip is of a low friction coefficient material.

10. A corner bracket system for a generally U-shaped bow portion, the bow portion having a horizontal upper bridging portion and a pair of leg portions, the corner bracket system comprising (a) a corner bracket comprising (i) a central body portion with oppositely directed end faces interconnected by an inner and an outer curved web with a radial web extending therebetween; and (ii) A pair of tongues extending from each of oppositely directed end faces and each member of the pair of tongues offset from the inner and outer curved webs so as to define a shoulder with the inner and outer edges of each face; and (b) a pair of corner plates, each corner plate having a central body portion corresponding in profile to the central body portion of the corner bracket and a pair of extensions projecting outwardly therefrom;

wherein the pair of tongues and the extensions are adapted to be received in the horizontal upper bridging portion and one member of the pair of leg portions.

11. The corner bracket of claim 10 wherein the inner and outer curved webs of the central body extend through 90° so that the oppositely directed end faces are orthogonal to one another.

12. The corner bracket of claim 11 wherein the corner bracket and corner plates are obtained from a continuous extrusion having the profile of the corner bracket and corner plates.

* * * * *